United States Patent [19]

Tsukamoto et al.

[11] Patent Number: 5,653,660
[45] Date of Patent: Aug. 5, 1997

[54] CONTROL SYSTEM FOR AUTOMATIC TRANSMISSION

[75] Inventors: Kazumasa Tsukamoto, Toyota; Masahiro Hayabuchi; Masaaki Nishida, both of Anjo; Yoshihisa Yamamoto, Nishio, all of Japan

[73] Assignee: Aisin AW Co., Ltd., Japan

[21] Appl. No.: 428,633

[22] Filed: Apr. 25, 1995

[30] Foreign Application Priority Data

Jun. 21, 1994 [JP] Japan ................................. 6-139211

[51] Int. Cl.⁶ ........................................... F16H 61/04
[52] U.S. Cl. ........................... 477/143; 477/156; 477/158; 475/120
[58] Field of Search ........................ 477/143, 95, 96, 477/156, 158, 159, 160; 475/119, 120

[56] References Cited

U.S. PATENT DOCUMENTS

| | | | |
|---|---|---|---|
| 4,445,401 | 5/1984 | Ishimaru | 477/144 |
| 4,603,604 | 8/1986 | Nishikawa et al. | 74/869 |
| 4,713,989 | 12/1987 | Hayakawa et al. | 477/150 |
| 4,722,251 | 2/1988 | Sumiya et al. | 477/143 |
| 4,781,081 | 11/1988 | Shibata et al. | 477/143 |
| 4,840,092 | 6/1989 | Sakaguchi et al. | 477/93 |
| 4,850,251 | 7/1989 | Kuwayama et al. | 74/866 |
| 5,050,459 | 9/1991 | Ishikawa et al. | 477/117 |
| 5,078,028 | 1/1992 | Ishikawa et al. | 477/117 X |
| 5,115,696 | 5/1992 | Takada et al. | 475/116 |
| 5,157,992 | 10/1992 | Hayashi et al. | 477/40 |
| 5,342,253 | 8/1994 | Mizobe et al. | 475/120 X |

*Primary Examiner*—Andrea L. Pitts
*Assistant Examiner*—Peter T. Kwon
*Attorney, Agent, or Firm*—Lorusso & Loud

[57] ABSTRACT

The automatic transmission equipped with the control system of this invention is combined with a coupling for transmitting the rotation of the engine to the transmission and includes: a clutch which is applied when a forward running range is selected; a hydraulic servo which receives an oil pressure for applying the clutch; and a hydraulic control unit for controlling the oil pressure to the hydraulic servo. The hydraulic control unit includes: a manual valve which, when moved to a forward drive position by the operation of a shift lever, receives oil pressure from an oil pressure source, and supplies that oil pressure as a forward range oil pressure in a first oil passage; a regulator valve for regulating the oil pressure coming from the oil pressure source to thereby generate a regulated oil pressure in a second oil passage; a change-over valve switchable between (1) a first position for supplying the forward range oil pressure to a third oil passage and (2) a second position for supplying the regulated oil pressure to the third oil passage; a fourth oil passage for feeding the regulated oil pressure to the hydraulic servo while bypassing the change-over valve; and a one-way valve arranged in the fourth oil passage for allowing oil flow only in the direction from the regulator valve to the hydraulic servo.

3 Claims, 14 Drawing Sheets

|   |   | Solenoid | | | Clutch | | | Brake | | | | One-way Clutch | | |
|---|---|---|---|---|---|---|---|---|---|---|---|---|---|---|
|   |   | S1 | S2 | S3 | C1 | C2 | C3 | B1 | B2 | B3 | B4 | F1 | F2 | F3 |
| R |   | × | ○ | × | × | × | × | × | × | ○ | ○ | × | × | × |
| N |   | × | ○ | × | × | × | × | × | × | × | ○ | × | × | × |
| D | 1 ST | × | ○ | △ | ○ | × | × | × | × | (○) | ○ | × | ○ | ○ |
| D | 2 ND | ○ | ○ | △ | ○ | × | × | ○ | ○ | × | ○ | ○ | × | ○ |
| D | 3 RD | ○ | × | × | ○ | × | ○ | ○ | ○ | × | × | ○ | × | × |
| D | 4 TH | × | × | × | ○ | ○ | ○ | × | ○ | × | × | × | × | × |

FIG. 3

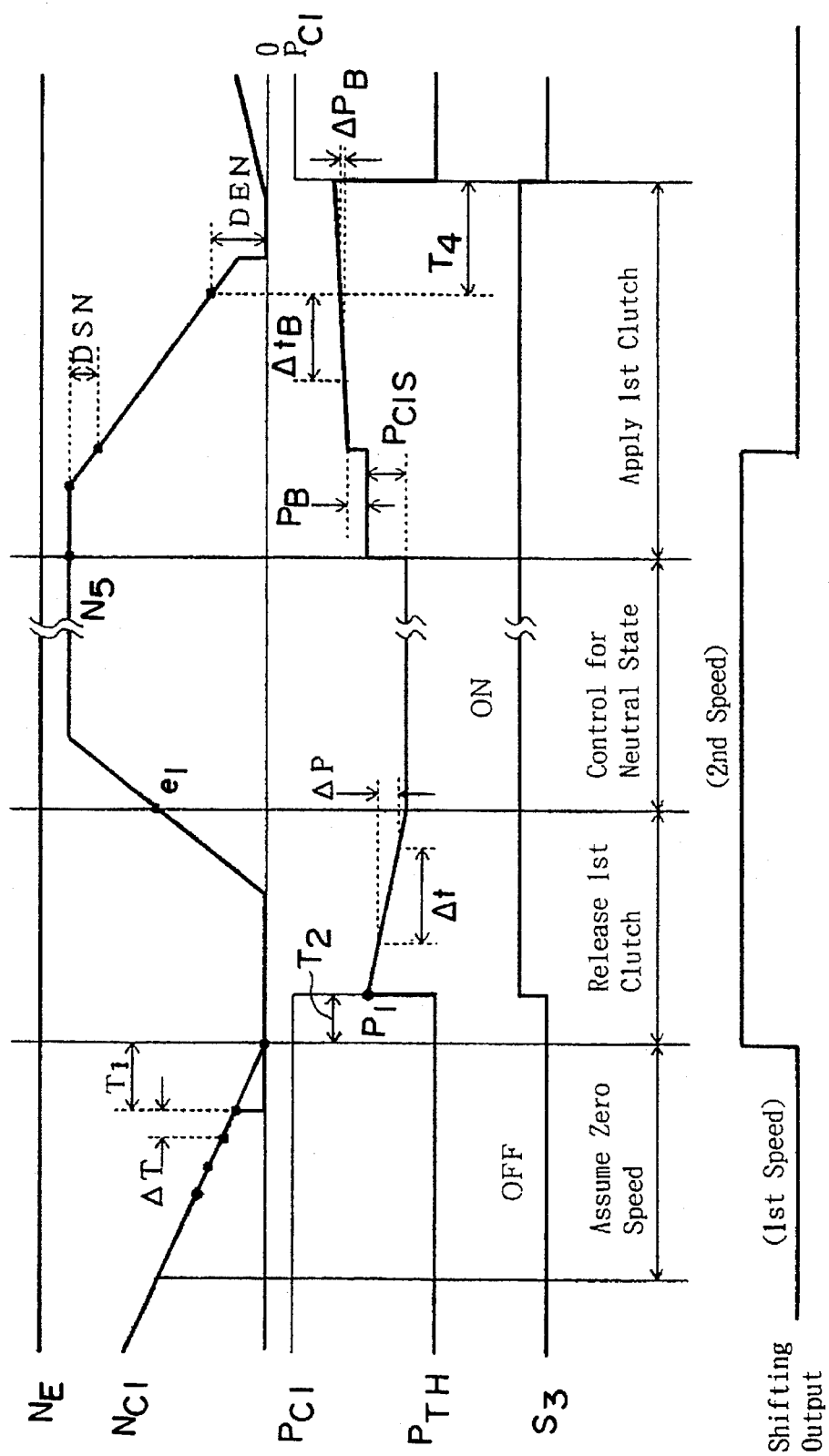

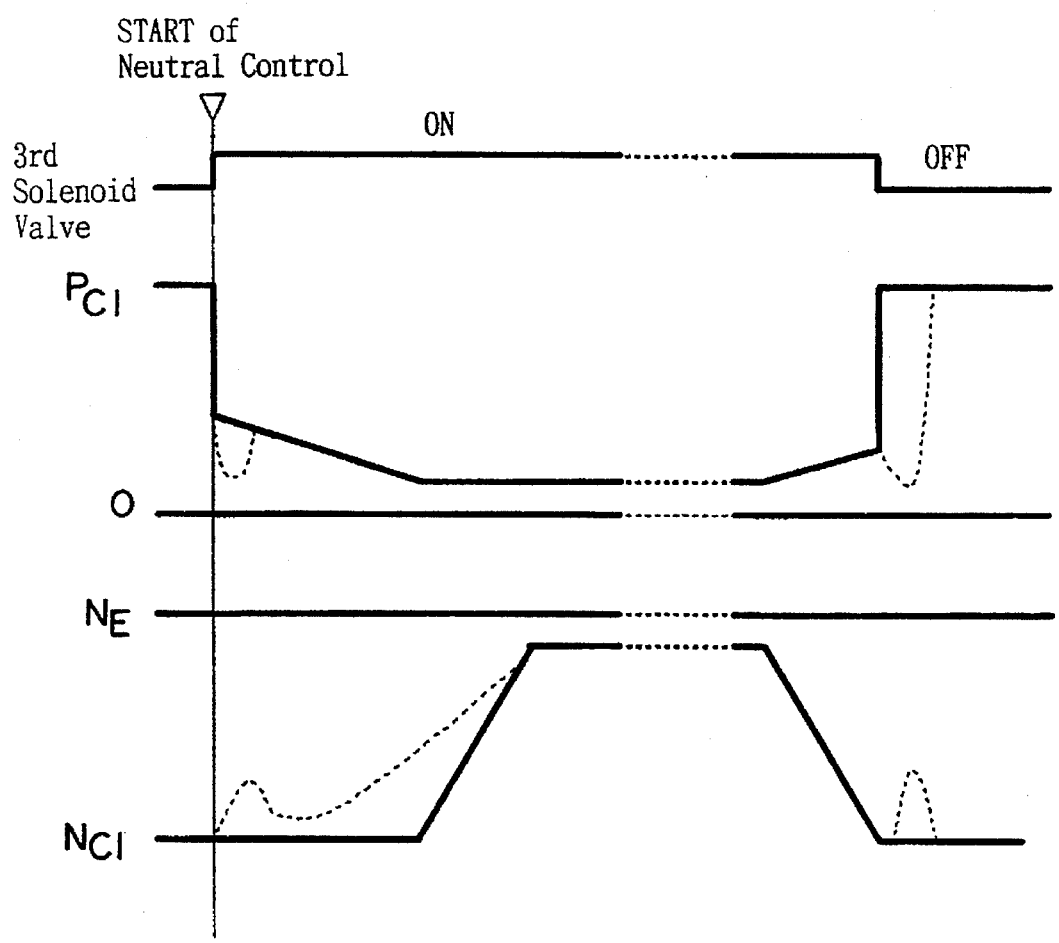

CONTROL SYSTEM FOR AUTOMATIC TRANSMISSION

BACKGROUND OF THE INVENTION

1. Field of the Invention

The present invention relates to a control system for an automatic transmission.

2. Related Art

Automatic transmissions are conventionally combined with torque converters, acting as fluid couplings, for transmitting the rotational output of the engine to the transmission. The conventional transmission is equipped with at least one planetary gear unit composed of a plurality of gear elements for effecting shifting in accordance with a shift pattern which is preset to correspond to the vehicle speed, the throttle opening and so on.

The conventional automatic transmission provides a (parking) P-range, a (reverse) R-range, a (neutral) N-range, a (drive) D-range, a (second) S-range, a (low) L-range and so on. If the range is switched from the N-range to the D-range responsive to movement of the shift lever, for example, the rotation of the engine in the idling state is transmitted through the torque converter to the transmission, to cause a creep phenomenon in which the vehicle will advance little by little without any depression of the accelerator pedal.

Therefore, when it is detected that a range such as the D-range, the S-range or the L-range (hereinafter each will be called a "forward range") for running the vehicle forward is selected, that the accelerator pedal is released, that the brake pedal is depressed and that the vehicle speed is substantially "0", the forward clutch which is applied in forward running, i.e., a first clutch, is brought into slipping engagement to establish a pseudo-neutral state (hereinafter referred to as the "neutral control state") so that the aforementioned creep phenomenon may be prevented.

While idling in the D-range, the oil pressure fed to the hydraulic servo of the first clutch is lowered to establish slipping engagement so that the difference in the R.P.M. between the input and output of the torque converter will become a predetermined value for preventing the creep phenomenon (as disclosed in U.S. Pat. No. 4,850,251).

For this purpose, a signal pressure is produced so that a regulating oil pressure is produced by a regulator valve in response to the signal pressure. Moreover, a change-over valve is provided to selectively feed the regulated oil pressure or the D-range pressure to the hydraulic servo of the first clutch so that either the ordinary shift state or the neutral control state may be selected.

In the neutral control state, it is possible, when the accelerator pedal is depressed, to again apply the first clutch, for example, to prevent the delay in the application due to stroke loss of the clutch piston, racing of the engine, and shock of engagement.

In the aforementioned control system for an automatic transmission of the prior art, however, the change-over valve selectively establishes communication of its various ports by reciprocation of its spool. As a result, during switching of the change-over valve, there is a brief interval in which neither the regulated oil pressure nor the D-range pressure is fed to the hydraulic servo of the first clutch, so that the oil pressure of the hydraulic servo temporarily drops. Such a temporary drop in oil pressure might cause the first clutch to abruptly release, thereby providing a release shock. Further, if the first clutch is abruptly applied, after the abrupt release, an engaging shock may also occur.

SUMMARY OF THE INVENTION

An object of the present invention is to solve the aforementioned problems of the automatic transmission control system of the prior art and to provide a control system for an automatic transmission which is free of any temporary drop of the oil pressure to the hydraulic servo during the time of switching between an ordinary shifting state and the neutral control state.

The basic elements of the control system of the present invention include a clutch which is applied responsive to selection of a forward running range; a hydraulic servo which receives an oil pressure for applying the clutch; and a hydraulic control unit for controlling the oil pressure to the hydraulic servo.

The hydraulic control unit includes a manual valve adapted to be switched, when in a forward drive position, by the operation of a shift lever, for receiving oil from an oil pressure source, and for providing a forward range oil pressure in a first oil passage; a regulator valve for regulating oil pressure coming from the oil pressure source to generate a regulated oil pressure in a second oil passage; a change-over valve switchable between a first position providing the forward range oil pressure to a third oil passage, and a second position providing the regulated oil pressure to the third oil passage; a fourth oil passage for feeding the regulated oil pressure to the hydraulic servo while bypassing the change-over valve; and a one-way valve arranged in the fourth oil passage for allowing oil to flow in one direction only, i.e. in the direction from the regulator valve to the hydraulic servo.

Thus, by switching the change-over valve, the regulated oil pressure or the forward range oil pressure can be selectively fed to the hydraulic servo for the clutch to switch the clutch between the ordinary shifting state and the neutral control state.

In movement of the spool during switching of the change-over valve, there is a brief, temporary interval in which neither the first oil passage nor the second oil passage has communication with the third oil passage, that is, an interval where neither the regulated oil pressure nor the forward range pressure is fed to the hydraulic servo. During this brief interval, a relatively large amount of oil leakage from the oil pressure feed passage to the hydraulic servo occurs so that the oil pressure in the hydraulic servo drops. Therefore, the regulated oil pressure is fed to the hydraulic servo via the fourth oil passage. As a result, in switching of the change-over valve between the ordinary shifting state and the neutral control state, the oil pressure to the hydraulic servo does not drop. As a result, the clutch will not be abruptly released or applied thereby avoiding both releasing shock and engaging shock.

Moreover, the fourth oil passage is provided with the one-way valve means to allow the oil to feed in one direction only, from the change-over valve to the hydraulic servo. As a result, the regulated oil pressure can be prevented from flowing out of the oil pressure passage to the hydraulic servo, so that the oil pressure in the hydraulic servo will not drop.

BRIEF DESCRIPTION OF THE DRAWINGS

FIG. 3 is a chart of the operations of an automatic transmission controlled by the system of the present invention;

FIG. 16 is a time chart of operations of an automatic transmission under control of an embodiment of the control system of the present invention; and FIG. 17 is a graph of fluctuations of the C-1 oil pressure and the clutch input side R.P.M. accruing from switching the neutral relay valve in the embodiment of the present invention.

DESCRIPTION OF THE PREFERRED EMBODIMENT

An embodiment of the present invention will be described in detail in the following with reference to the accompanying drawings.

Figure 2:
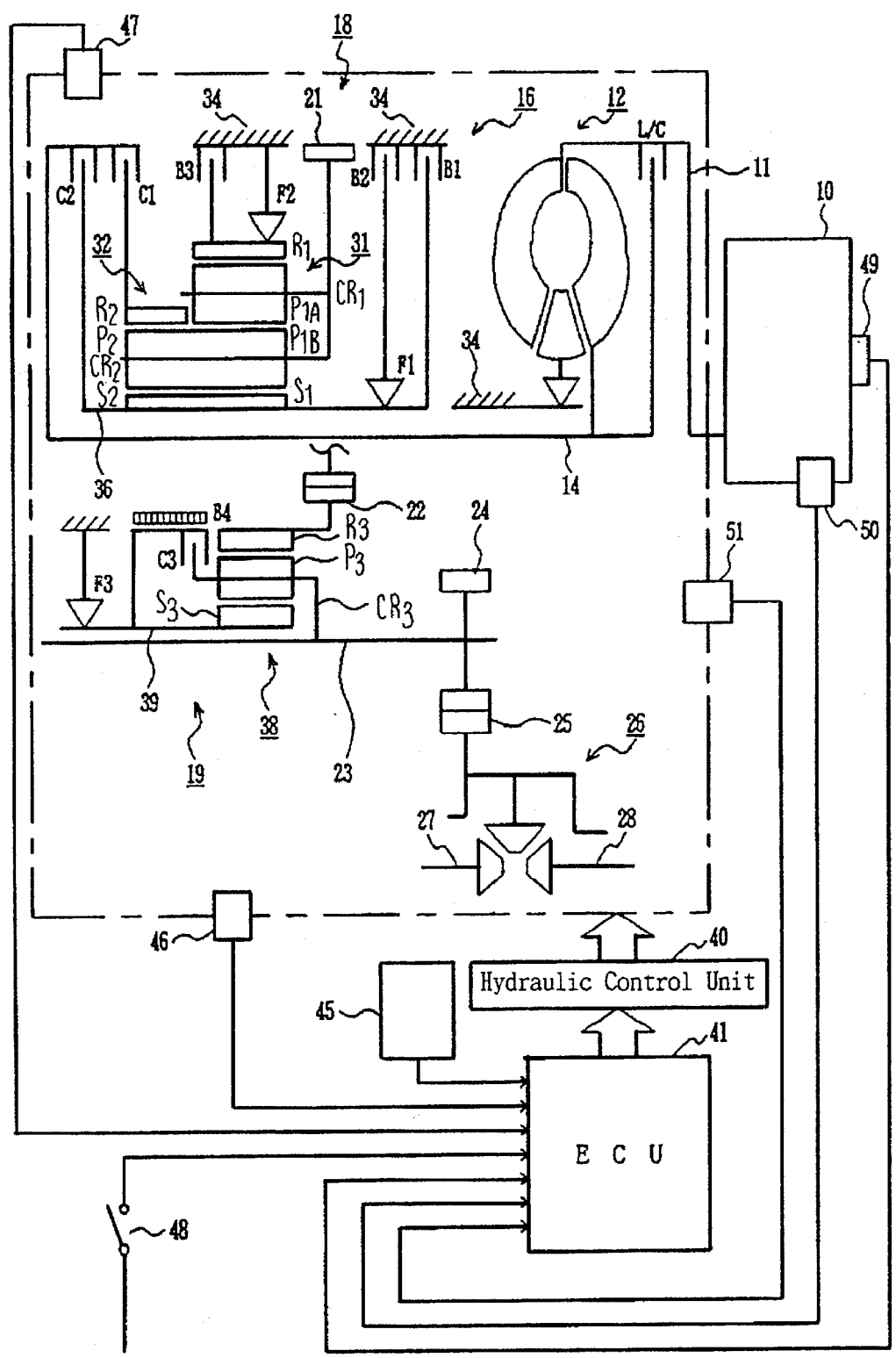
FIG. 2 is a schematic diagram of an automatic transmission equipped with the control system of the present invention.

As shown in FIG. 2, the rotation generated by the engine 10 is transmitted through its output shaft 11 to a torque converter 12 acting as a fluid coupling. This torque converter 12 transmits the rotation of the engine 10 through a working fluid to an output shaft 14 or directly to the output shaft 14 by operation of a lockup clutch L/C which is applied when the vehicle speed exceeds a predetermined value.

The rotation of output shaft 14 is transmitted to the transmission 16 for selectively establishing one of four forward and one reverse speeds. This transmission 16 is composed of a main transmission 18 for effecting three forward and one reverse speeds, and an under-drive auxiliary transmission 19. Thus, the rotation of the main transmission 18 is transmitted through a counter drive gear 21 and a counter driven gear 22 to the auxiliary transmission 19, the output shaft 23 of which has its rotation transmitted through an output gear 24 to a differential unit 26.

In differential unit 26, the rotation transmitted through the output gear 24 and the ring gear 25 are differentiated so that the different rotations are transmitted to the drive wheels (not shown) through left-hand and right-hand drive shafts 27 and 28.

The main transmission 18 is equipped not only with a first planetary gear unit 31 and a second planetary gear unit 32, but also with a first clutch C1, a second clutch C2, a first brake B1, a second brake B2, a third brake B3, a first one-way clutch F1 and a second one-way clutch F2, all for selectively transmitting torque between the individual elements of the two planetary gear units 31 and 32.

The first planetary gear unit 31 is composed of: a ring gear $R_1$ connected to a drive unit casing 34 through the third brake B3 and the second one-way clutch F2 which are juxtaposed to each other; a sun gear $S_1$ formed on a sun gear shaft 36 which is fitted on and rotatably supported by the output shaft 14; a carrier $CR_1$ connected to the counter drive gear 21; and pinions $P_{1A}$ and $P_{1B}$ meshing between the ring gear $R_1$ and the sun gear $S_1$ and rotatably supported by the carrier $CR_1$.

The aforementioned sun gear shaft 36 is connected through the second clutch C2 to the output shaft 14. Moreover, the sun gear shaft 36 is connected to the drive unit casing 34 through the first brake B1 and through the first one-way clutch F1 and the second brake B2 which are juxtaposed to each other.

The second planetary gear unit 32 is composed of: a ring gear $R_2$ connected through a first clutch C1 to the output shaft 14; a sun gear $S_2$ formed on the sun gear shaft 36 integrally with the sun gear $S_1$; a carrier $CR_2$ connected to the carrier $CR_1$; and a pinion $P_2$ meshing between the ring gear $R_2$ and the sun gear $S_2$, rotatably supported by the carrier $CR_2$ and formed integrally with the pinion $P_{1B}$.

The counter drive gear 21 is meshed with the counter driven gear 22, which is arranged in the auxiliary transmission 19, to transmit the rotational output of the main transmission 18 to the auxiliary transmission 19.

The auxiliary transmission 19 includes a third planetary gear unit 38, and has a third clutch C3, a fourth brake B4 and a third one-way clutch F3, all for selectively transmitting the torque between the individual elements of the third planetary gear unit 38.

This third planetary gear unit 38 is composed of: a ring gear $R_3$ connected to the counter driven gear 22; a sun gear $S_3$ formed on a sun gear shaft 39 which is rotatably fitted on the output shaft 23; a carrier $CR_3$ fixed on the output shaft 23; and a pinion $P_3$ meshing between the ring gear $R_3$ and the sun gear $S_3$ and rotatably supported by the carrier $CR_3$.

FIG. 3 tabulates the operations of the above-described automatic transmission. In FIG. 3, S1 is the first solenoid valve, S2 is the second solenoid valve, S3 is the third solenoid valve, C1 is the first clutch, C2 is the second clutch, C3 is the third clutch, B1 is the first brake; B2 is the second brake, B3 is the third brake, B4 is the fourth brake, F1 is the first one-way clutch, F2 is the second one-way clutch, and F3 is the third one-way clutch. Moreover, R is the R-range, N is the N-range, D is the D-range, 1ST is a 1st speed gear stage, 2ND is a 2nd speed gear stage, 3RD is a 3rd speed gear stage, and 4TH is a 4th speed gear stage.

Moreover, in FIG. 3 the symbol o indicates that the first solenoid valve S1, the second solenoid valve S2 and/or the third solenoid valve S3 is ON, that the first clutch C1, the second clutch C2, the third clutch C3, the first brake B1, the second brake B2, the third brake B3 and/or the fourth brake B4 is applied, and that the first one-way clutch F1, the second one-way clutch F2 and/or the third one-way clutch F3 is locked. On the other hand, symbol X indicates that the first solenoid valve S1, the second solenoid valve S2 and/or the third solenoid valve S3 is OFF, that the first clutch C1, the second clutch C2, the third clutch C3, the first brake B1, the second brake B2, the third brake B3 and/or the fourth brake B4 is released, and that the first one-way clutch F1, the second one-way clutch F2 and/or the third one-way clutch F3 is free.

Incidentally, symbol Δ indicates that those elements are turned ON/OFF when a neutral control state is established, and symbol (o) indicates that the elements are applied for engine braking. At the 1st speed in the D-range, the first clutch C1 and the fourth brake B4 are applied, and the second one-way clutch F2 and the third one-way clutch F3 are locked. Then, the rotation of the input shaft 14 is transmitted through the first clutch C1 to the ring gear $R_2$. Since, in this state, the rotation of the ring gear $R_1$ is blocked by the second one-way clutch F2, the rotation of the carrier $CR_2$ is drastically decelerated, while idly rotating the sun gear $S_2$, and is transmitted to the counter drive gear 21.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is further decelerated and is transmitted to the output shaft 23.

At the 2nd speed in the D-range, on the other hand, the first clutch C1, the first brake B1, the second brake B2 and the fourth brake B4 are applied, and the first one-way clutch F1 and the third one-way clutch F3 are locked. Then, the rotation of the input shaft 14 is transmitted through the first clutch C1 to the ring gear $R_2$, but the rotation of the sun gear S2 is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, the rotation of the sun gear $S_3$ is blocked by the fourth brake B4, the rotation of the carrier $CR_3$ is decelerated and transmitted to the output shaft 23.

Next, at the 3rd speed in the D-range, the first clutch C1, the third clutch C3, the first brake B1 and the second brake B2 are applied, and the first one-way clutch F1 is locked. Then, the rotation of the input shaft 14 is transmitted through the first clutch C1 to the ring gear $R_2$, and the rotation of the sun gear $S_2$ is blocked by the second brake B2 and the first one-way clutch F1. As a result, the rotation of the ring gear $R_2$ is decelerated and transmitted to the carrier $CR_2$, the rotation of which is transmitted to the counter drive gear 21 while idly rotating the ring gear $R_1$.

The rotation transmitted from the counter drive gear 21 to the counter driven gear 22 is transmitted to the ring gear $R_3$. Since, however, the relative rotations of the carrier $CR_3$ and the sun gear $S_3$ are blocked by the third clutch C3, the third planetary gear 38 comes into its directly connected state. As a result, the rotation of the counter driven gear 22 is transmitted as is to the output shaft 23.

Next, at the 4th speed in the D-range, the first clutch C1, the second clutch C2, the third clutch C3 and the second brake B2 are applied. Then, the rotation of the input shaft 14 is transmitted through the first clutch C1 to the ring gear $R_2$ and through the second clutch C2 to the sun gear $S_2$ so that the first and second planetary gear units 31 and 32 come into their directly connected states. As a result, the rotation of the output shaft 11 is transmitted as is to the counter drive gear 21.

The rotation transmitted from the counter driven gear 21 to the counter driven gear 22 is transmitted to the ring gear $R_3$. Since, however, the relative rotations of the carrier $CR_3$ and the sun gear $S_3$ are blocked by the third clutch C3, the third planetary gear unit 38 comes into its directly connected state. As a result, the rotation of the counter driven gear 22 is transmitted as is to the output shaft 23.

A hydraulic circuit is provided for applying/releasing the first clutch C1, the second clutch C2, the third clutch C3, the first brake B1, the second brake B2, the third brake B3 and the fourth brake B4, and this hydraulic circuit, in turn, is controlled by a hydraulic control circuit 40. This hydraulic control circuit 40 is connected to a controller (i.e., ECU) 41 so that it is controlled according to the control program of the automatic transmission control system 41.

The controller 41 receives signals from a neutral start switch (i.e., N.S.S.W.) 45, an oil temperature sensor 46, an R.P.M. sensor 47, a brake switch 48, an engine R.P.M. sensor a throttle opening sensor 50 and a vehicle speed sensor 51.

Thus, the position of the shift lever (not-shown), i.e., the selected range, is detected by the neutral start switch 45; the temperature of the oil in the hydraulic circuit is detected by the oil temperature sensor 46; and the R.P.M. of the input side of the first clutch C1, i.e., the R.P.M. $N_{C1}$ of the output shaft 14 (hereinafter the "clutch input side R.P.M.") is detected by the R.P.M. sensor 47.

Operation of the brake pedal is detected by the brake switch 48; the engine R.P.M. $N_E$ can be detected by the engine R.P.M. sensor 49; the throttle opening θ is detected by the throttle opening sensor 50; and the vehicle speed is detected by the vehicle speed sensor 51.

Here, the range position detecting means is composed of the neutral start switch 45, and the vehicle stop detecting means is composed of the brake switch 48, the engine R.P.M. sensor 49, the throttle opening sensor 50 and the vehicle speed sensor 51.

Figure 4:
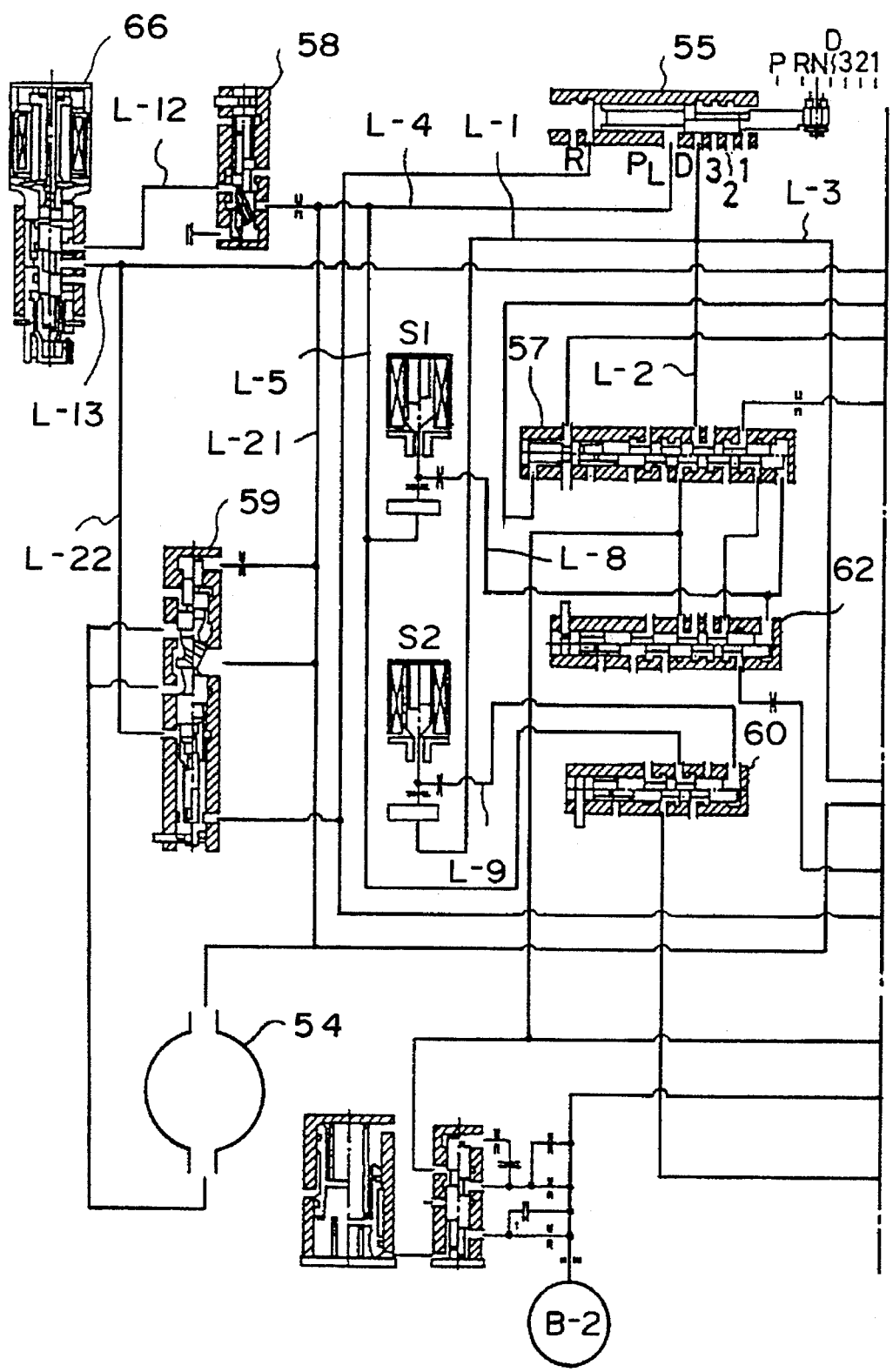
FIGS. 4 and 5 show a hydraulic circuit diagram of one embodiment of the control system of the present invention.
Figure 5:
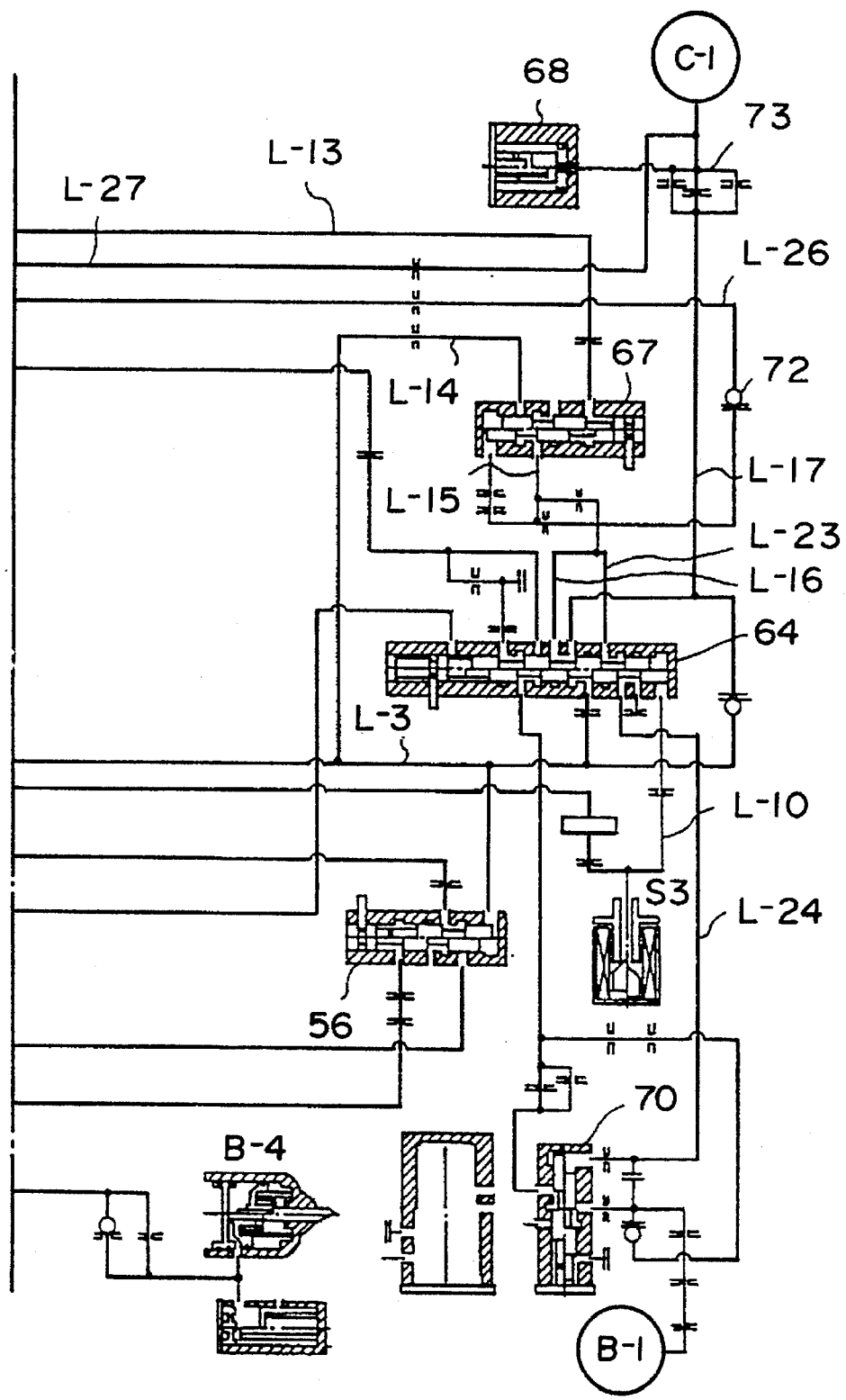

An embodiment of the hydraulic control circuit will now be described with reference to FIGS. 1, 4 and 5. As shown in FIG. 4, a primary valve 59 regulates the oil pressure coming from an oil pressure source 54 and outputs it as a line pressure to an oil passage L-21. A manual valve 55 is formed with ports 1, 2, 3, D, $P_L$ and R. The line pressure fed from the primary valve 59 to the port $P_L$, via the oil passage L-21 and an oil passage is established as the 1st-range pressure, the 2nd-range pressure, the 3rd-range pressure, the D-range or forward-range pressure and the R-range pressure at the ports 1, 2, 3, D and R, respectively, by operation of the shift lever (not-shown).

When the shift lever is shifted to the forward drive position, the D-range pressure oil is fed via an oil passage L-1 to the second solenoid valve S2, via an oil passage L-2 to a 1-2 shift valve 57, and via an oil passage L-3 to a B-1 sequence valve 56. On the other hand, the line pressure from the primary valve 59 is fed via the oil passage L-21 to the third solenoid valve S3.

Moreover, the line pressure from the oil passage L-21 is fed via the oil passage L-4 to a solenoid modulator valve 58 and further via an oil passage L-5 to the first solenoid valve S1 and a 2-3 shift valve 60.

The first solenoid valve S1, the second solenoid valve S2 and the third solenoid valve S3 are turned ON/OFF in response to the signals of the hydraulic control circuit 40 (of FIG. 2) so that the first solenoid valve S1 feeds a signal oil pressure via an oil passage L-8 to the 1-2 shift valve 57 and a 3-4 shift valve 62, so that the second solenoid valve S2 feeds a signal oil pressure via an oil passage L-9 to the 2-3 shift valve 60, and so that the third solenoid valve S3 feeds a signal oil pressure via an oil passage L-10 to a neutral relay valve 64 acting as the change-over valve.

The 1-2 shift valve 57 takes the upper half position shown in FIG. 4 in the 1st speed and the lower half position in the 2nd, 3rd and 4th speeds. The 2-3 shift valve 60 takes the lower half position in the 1st and 2nd speeds and the upper half position in the 3rd and 4th speeds. The 3-4 shift valve 62 takes the upper half position in the 1st and 4th speeds and the lower half position in the 2nd and 3rd speeds. The neutral relay valve 64 takes the upper half position in the neutral control state and the lower half position in the 1st to 4th speeds.

The solenoid module valve 58 is connected via an oil passage L-12 with a linear solenoid valve 66, which is connected via an oil passage L-13 with a C-1 control valve 67 acting as the regulator valve. The linear solenoid valve is further connected via an oil passage L-22 with the primary valve 59.

Responsive to a signal from the hydraulic control circuit 40, the linear solenoid valve 66 is controlled to feed a throttle pressure as the control oil pressure to the C-1 control valve 67. This C-1 control valve 67 is fed with the D-range pressure via oil passages L-13 and L-14 and regulates the D-range pressure to produce a regulated C-1 oil pressure $P_{C1}$. The regulated C-1 oil pressure $P_{C1}$ corresponds to the throttle pressure coming from the linear solenoid valve 66 and is directed to the hydraulic servo C-1 via an oil passage L-15 serving here as the second oil passage.

The aforementioned neutral relay valve 64 takes the upper half position in the neutral control state. In this neutral control state, therefore, the C-1 oil pressure $P_{C1}$ established in the oil passage L-15 is fed via an oil passage L-16, the neutral relay valve 64 and an oil passage L-17 (serving here as the third oil passage) to the hydraulic servo C-1. The C-1 oil pressure $P_{C1}$ is further fed via oil passages L-23 and L-24 to a B-1 modulator valve 70.

The neutral relay valve 64 normally takes the lower half position at the 1st to 4th speeds. As a result, at these 1st to 4th speeds, the D-range pressure oil is fed via the oil passage L-3, the neutral relay valve 64 and the oil passage L-17 to the hydraulic servo C-1. To establish the neutral control state, the neutral relay valve 64 is switched to the upper half position to connect the oil passage L-16 and the oil passage L-17. A damper valve 68 is arranged in the oil passage L-17 for absorbing the pulsations of the C-1 oil pressure $P_{C1}$. B-1, B-2 and B-3 are hydraulic servos for the first brake B1, the second brake B2 and the third brake B3, respectively.

By switching the neutral relay valve 64, either the C-1 oil pressure $P_{C1}$ or the D-range pressure is selectively fed to the hydraulic servo C-1 of the first clutch C1 to switch between the ordinary shifting state and the neutral control state.

Figure 1:
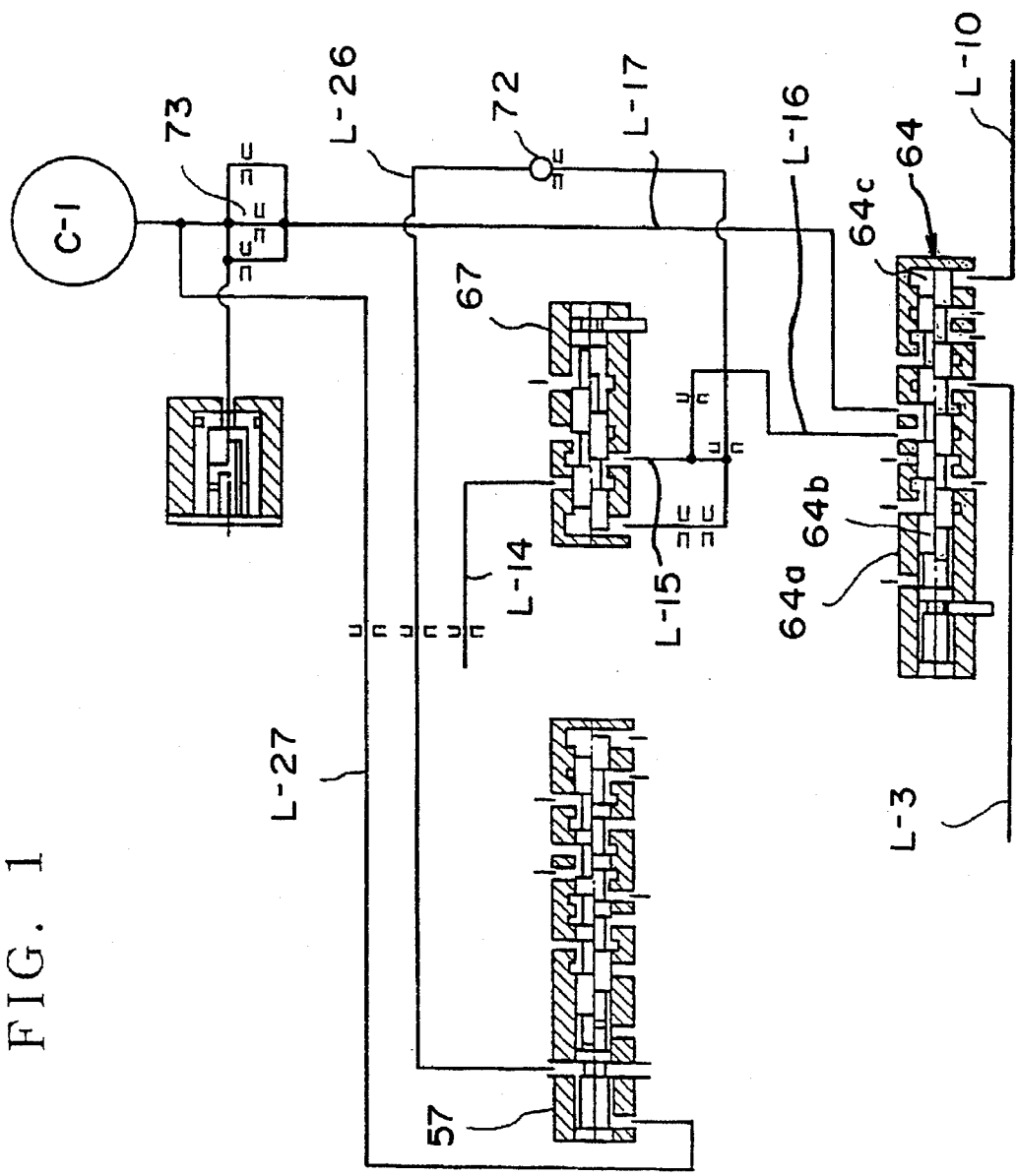
FIG. 1 is a hydraulic circuit diagram of one embodiment of the control system of the present invention.

As shown in FIG. 1, the neutral relay valve 64 includes a spool 64b fitted in a valve body 64a. When a signal oil chamber 64c formed at one end of the spool 64b is fed with the signal oil pressure from the oil passage L-10, the spool 64b is moved to selectively open the ports. As a result, in the switching of the neutral relay valve 64, a state in which neither the oil passage L-3 nor the oil passage L-15 communicates with the oil passage L-17 is temporarily established, that is, a state in which neither the C-1 oil pressure $P_{C1}$ nor the D-range pressure is fed to the hydraulic servo C-1. At this time, a relative high amount of oil leaks from the oil pressure feed passage to the hydraulic servo C-1 so that the oil pressure in the hydraulic servo C-1 would tend to drop. Therefore, in order, that the oil pressure in the hydraulic servo C-1 does not drop at the time of switching the neutral relay valve 64, the C-1 oil pressure $P_{C1}$ is fed to the hydraulic servo C-1 while bypassing the neutral relay valve 64. For this purpose, an oil passage L-26 (fourth oil passage) is provided branched from the oil passage L-16 so that the oil pressure built up in the oil passage L-15 can be fed via the oil passage L-26, the 1-2 shift valve 57 and an oil passage L-27 to the hydraulic servo C-1. The oil passage L-26 is arranged with a one-way valve 72 acting as the one-way valve means so that the oil can be fed from the C-1 control valve 67 to the hydraulic servo C-1. The one-way valve 72 closes the oil passage L-26, if its oil pressure is fed toward the hydraulic servo C-1, but opens the oil passage L-26 if not. As a result, the C-1 oil pressure $P_{C1}$ is not reduced when fed to the hydraulic servo C-1.

A throttle 73 is arranged in the oil passage L-17 upstream of the confluence with the oil passage L-27. The oil of the C-1 oil pressure $P_{C1}$ to be fed via the oil passage L-17 is throttled by the throttle 73.

Figure 6:
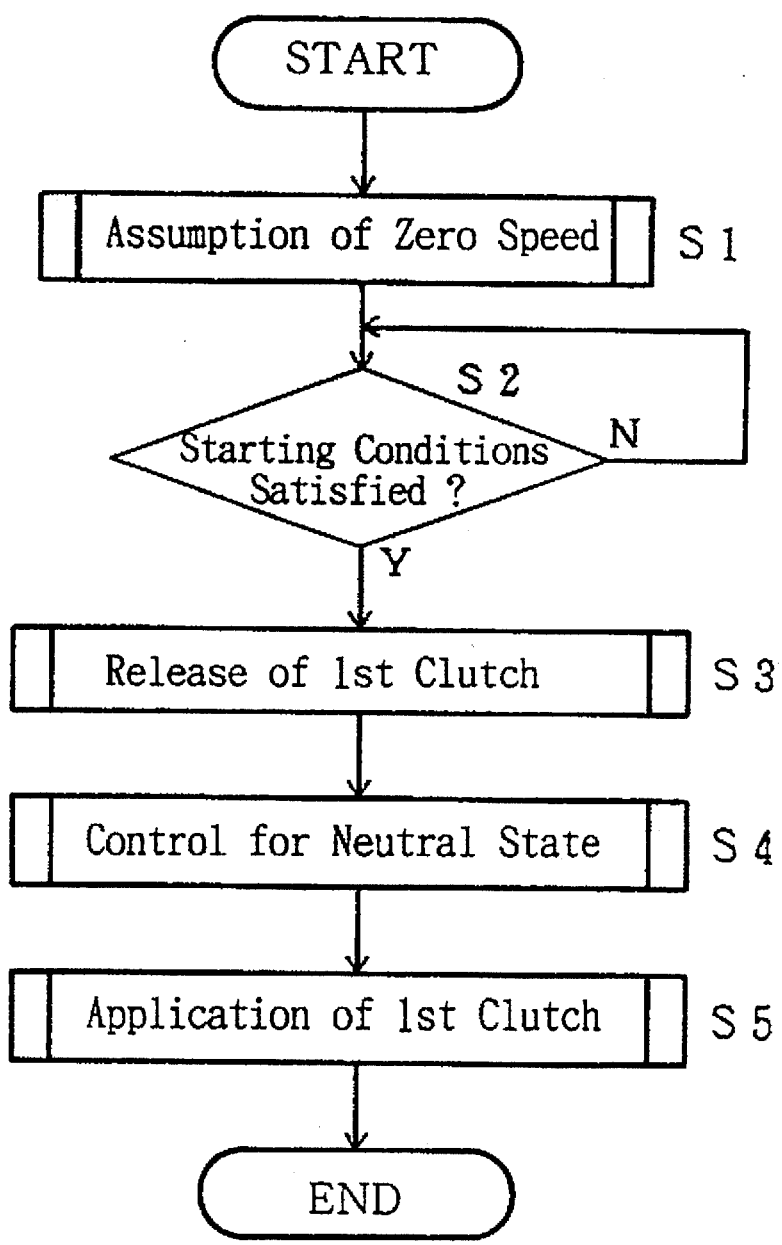
FIG. 6 is a main control flow chart showing the operations of the control system according to one embodiment of the present invention.

Referring now to FIG. 6, which is a main flow chart showing the operations of an automatic transmission control system according to an embodiment of the present invention:

Step S1: It is assumed on the basis of a change in the clutch input side R.P.M. $N_{C1}$ that the vehicle speed is zero.

Step S2: When the vehicle is brought to a stop by releasing the accelerator pedal (not shown) and by depressing the brake pedal (not shown), the routine awaits satisfaction of the conditions for starting the neutral control state. If this answer is YES (conditions satisfied), the routine advances to Step S3.

In step S2 the individual starting conditions which must be satisfied include: the zero assumption of the vehicle speed has ended; the throttle opening θ is no more than a predetermined value; the oil temperature detected by the oil temperature sensor 46 (FIG. 2) is no less than a predetermined value; and the brake switch 48 is ON.

Step S3: The first clutch is released by the initial pressure-reducing means. In this case, the C-1 oil pressure $P_{C1}$ is controlled responsive to the throttle pressure $P_{TH}$ which varies with the engine R.P.M. $N_E$, i.e. with the input torque. After this, the C-1 oil pressure $P_{C1}$ is reduced by a set amount.

Step S4: Neutral state control is initiated. However, the control routine first awaits stabilization of the engine R.P.M. $N_E$ and the clutch input side R.P.M. $N_{C1}$. After this stabilization, the C-1 oil pressure $P_{C1}$ is controlled by raising or lowering it by a set pressure on the basis of the engine R.P.M. $N_E$ and the clutch input side R.P.M. $N_{C1}$.

Step S5: The first clutch is applied. In this case, the C-1 oil pressure $P_{C1}$ is boosted by the set pressure which is set on the basis of the throttle opening θ, the engine R.P.M. $N_E$ and so on, to end the piston stroke of the hydraulic servo C-1 (of FIG. 5). At the end of the piston stroke of the hydraulic servo C-1, the C-1 oil pressure $P_{C1}$ is boosted by a set pressure to prevent application shock.

Figure 7:
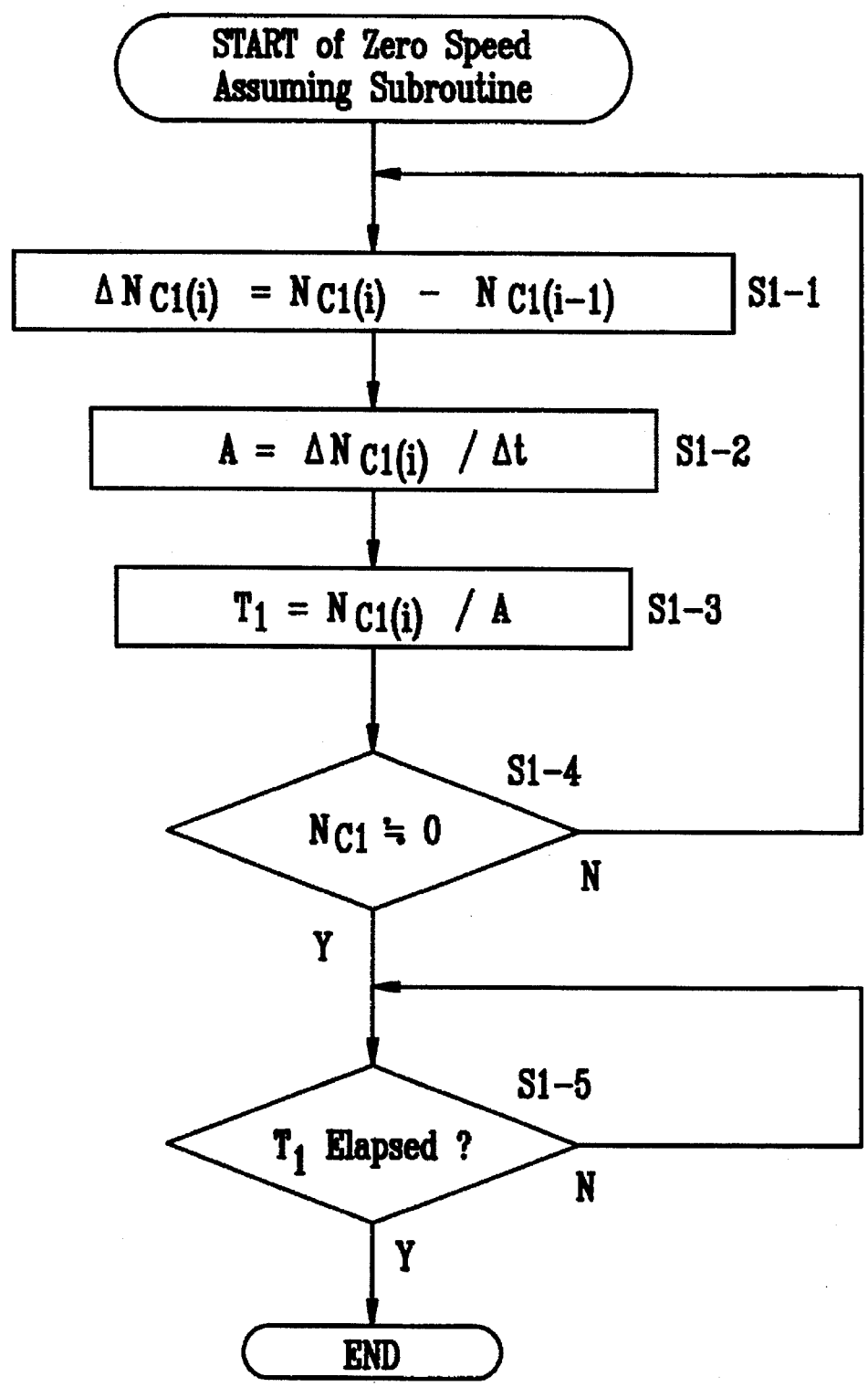
FIG. 7 is a flow chart showing a zero vehicle speed assuming subroutine in the embodiment of FIG. 6 (step S-1)

FIG. 7 shows the subroutine for the zero speed assumption of Step S1 of FIG. 6. In FIG. 7:

Step S1-1: An R.P.M. difference $\Delta N_{C1(i)}$ is calculated by subtracting a clutch input side R.P.M. $N_{C1(i-1)}$ at an instant preceding the present time by a period Δt, from a clutch input side R.P.M. $N_{C1(i)}$ at the present time. In this case, the time period Δt is set by a clock in the aforementioned automatic transmission control system 41 so that the clutch input side R.P.M. $N_{C1}$ is detected each time period Δt.

Step S1-2: The deceleration A of the vehicle is calculated by dividing the R.P.M. difference $\Delta N_{C1(i)}$ by the time period Δt.

Step S1-3: The time period $T_1$ for the vehicle to come to a stop is calculated by dividing the clutch input side R.P.M. $N_{C1(i)}$ at the present time by the deceleration A.

Step S1-4: The routine remains in standby until the clutch input side R.P.M. $N_{C1(i)}$ at the present time decreases to the point where it can no longer be measured. The subroutine then advances to Step S1-5. In other words, if the answer is YES the subroutine advances to S1-5, but returns to Step S1-1 if the answer is NO.

Step S1-5: The subroutine awaits lapse (as measured) by means of a timer (not shown) of a time period $T_1$. If this answer is YES, it is assumed that the vehicle speed v is zero.

Figure 8:
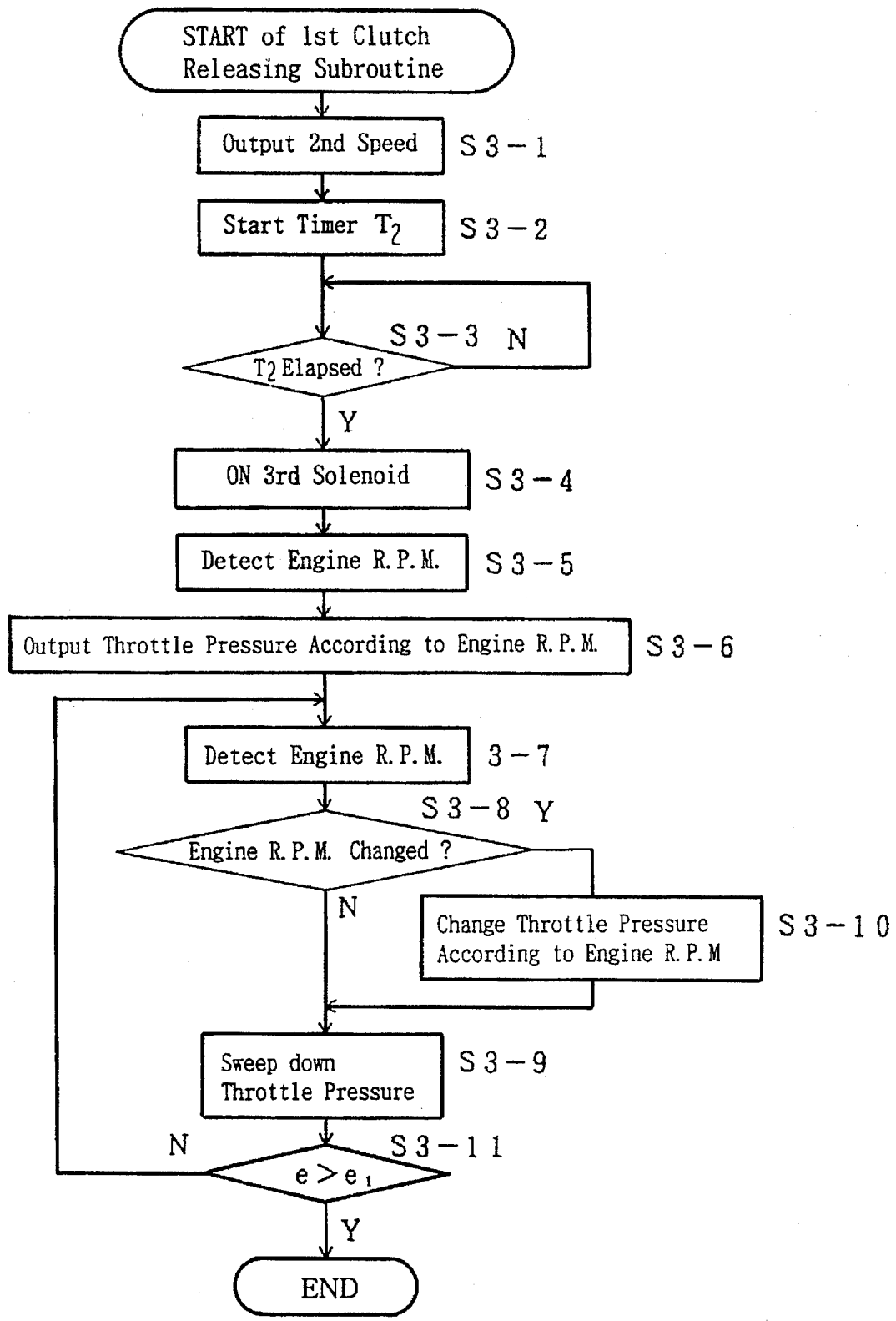
FIG. 8 is a flow chart illustrating a 1st clutch releasing subroutine in the embodiment of FIG. 6 (step S-3)
Figure 10:
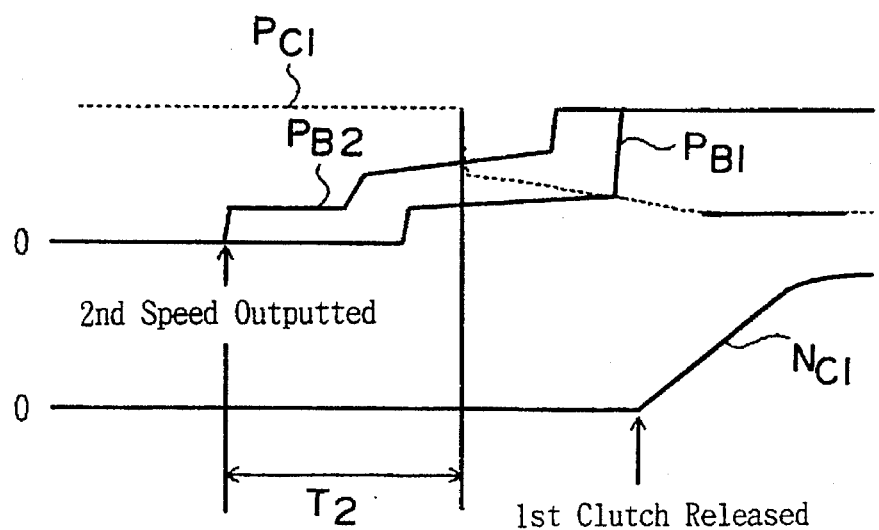
FIG. 10 is a time chart for 2nd speed shifting in an embodiment of the present invention.
Figure 11:
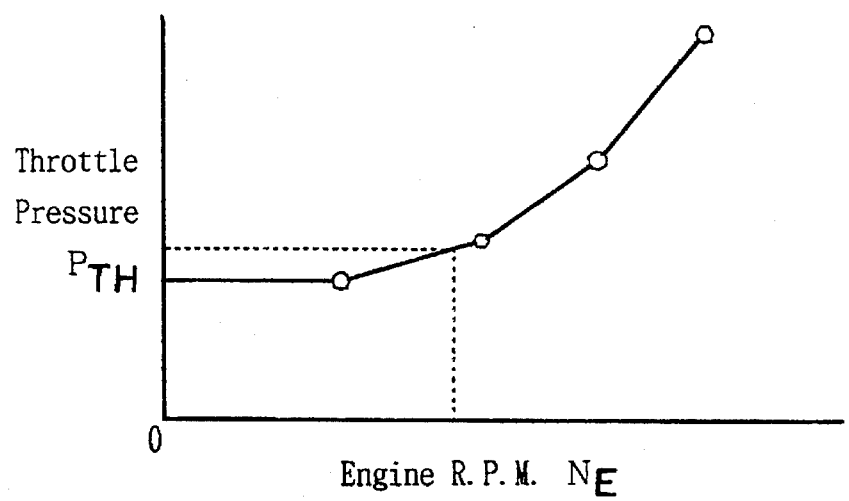
FIG. 11 is a graph plotting throttle pressure against engine R.P.M. in an embodiment of the present invention.

The first clutch releasing subroutine of Step S3 of FIG. 6 will now be described with reference to FIGS. 8, 10 and 11.

Step S3-1: After the starting conditions are satisfied, the 2nd speed shifting output is issued to apply the first brake B1 (of FIG. 2) to thereby to effect the hill-holding.

Step S3-2: Measurement of the time period $T_2$ is started by the timer (not shown).

Step S3-3: The application of the first brake B1 is delayed until lapse of the time period $T_2$. This time period $T_2$ has its value set by considering the time lag for the oil pressure of the hydraulic servo C-1 (of FIG. 5) to drop, as illustrated in FIG. 10, and the time lag for operation of the hydraulic servo B-1. As a result, the first clutch C1 is released after the first brake B1 has been applied, so that shock can be prevented following the shift and thereby effect smooth entry into the neutral control state.

Step S3-4: A signal $S_3$ is fed to the third solenoid valve S3 which is turned ON to switch the neutral relay valve 64 to the upper half position in which the C-1 oil pressure $P_{C1}$ is controlled.

Step S3-5: The engine R.P.M. $N_E$ corresponding to the input torque $T_T$ is detected and set to a reference engine R.P.M. $N_{Em}$.

Step S3-6: On the basis of the graph of FIG. 11, the throttle pressure $P_{TH}$ is lowered to the set oil pressure $P_1$ immediately before the first clutch C1 starts its slipping engagement in accordance with the engine R.P.M. $N_E$, to thereby lower the C-1 oil pressure $P_{C1}$.

Step S3-7: The engine R.P.M. $N_E$ corresponding to the input torque $T_T$ is again detected.

Step S3-8: It is decided whether or not the engine R.P.M. $N_E$ has changed, as compared with the reference engine R.P.M. $N_{Em}$. The subroutine advances to Step S3-9, if the answer is NO, but to Step S3-10 if YES.

Step S3-9: The throttle pressure $P_{TH}$ or the C-1 oil pressure $P_{C1}$ is reduced (or swept down) by a set pressure $\Delta P$ for each set time period $\Delta t$ corresponding to the engine R.P.M. $N_E$.

The time period $\Delta t$ and the set pressure $\Delta P$ are changed according to the reference engine R.P.M. $N_{Em}$. The throttle pressure $P_{TH}$ corresponding to the engine R.P.M. $N_E$ at this instant is determined from the graph of FIG. 11. If this throttle pressure $P_{TH}$ is lower than the C-1 oil pressure $P_{C1}$ at this instant, the setting of the throttle pressure $P_{TH}$ is changed. Moreover, the engine R.P.M. $N_E$ is set to the reference engine R.P.M. $N_{Em}$ at this instant.

Step S3-11: After the first clutch C1 has started to slip, the release deciding means awaits the release of the first clutch C1, i.e. until the speed ratio e, as defined by the following equation, exceeds a constant $e_1$:

$$e = N_{C1}/N_E.$$

When the speed ratio e exceeds the constant $e_1$, the initial pressure-reduction interrupting means interrupts the pressure reduction of Step S3-9. The constant $e_1$ is set to 0.75, for example, in consideration of the delay in the change of the engine R.P.M. $N_E$ at the time when the first clutch C1 is released. Incidentally, control in accordance with the speed ratio e may be replaced by control based on the clutch input side R.P.M. $N_{C1}$.

The state of the first clutch C1 cannot be decided on the basis of whether or not the aforementioned rotational difference $\Delta N$ has changed, because this rotational difference $\Delta N$ does not change no matter whether the first clutch C1 is completely applied or released. This makes it difficult to determine when the first clutch C1 is completely applied, and when the first clutch C1 is released.

Therefore, the state immediately before start of slipping engagement of the first clutch C1 is established by awaiting until the speed ratio e exceeds the constant $e_1$.

Figure 9:
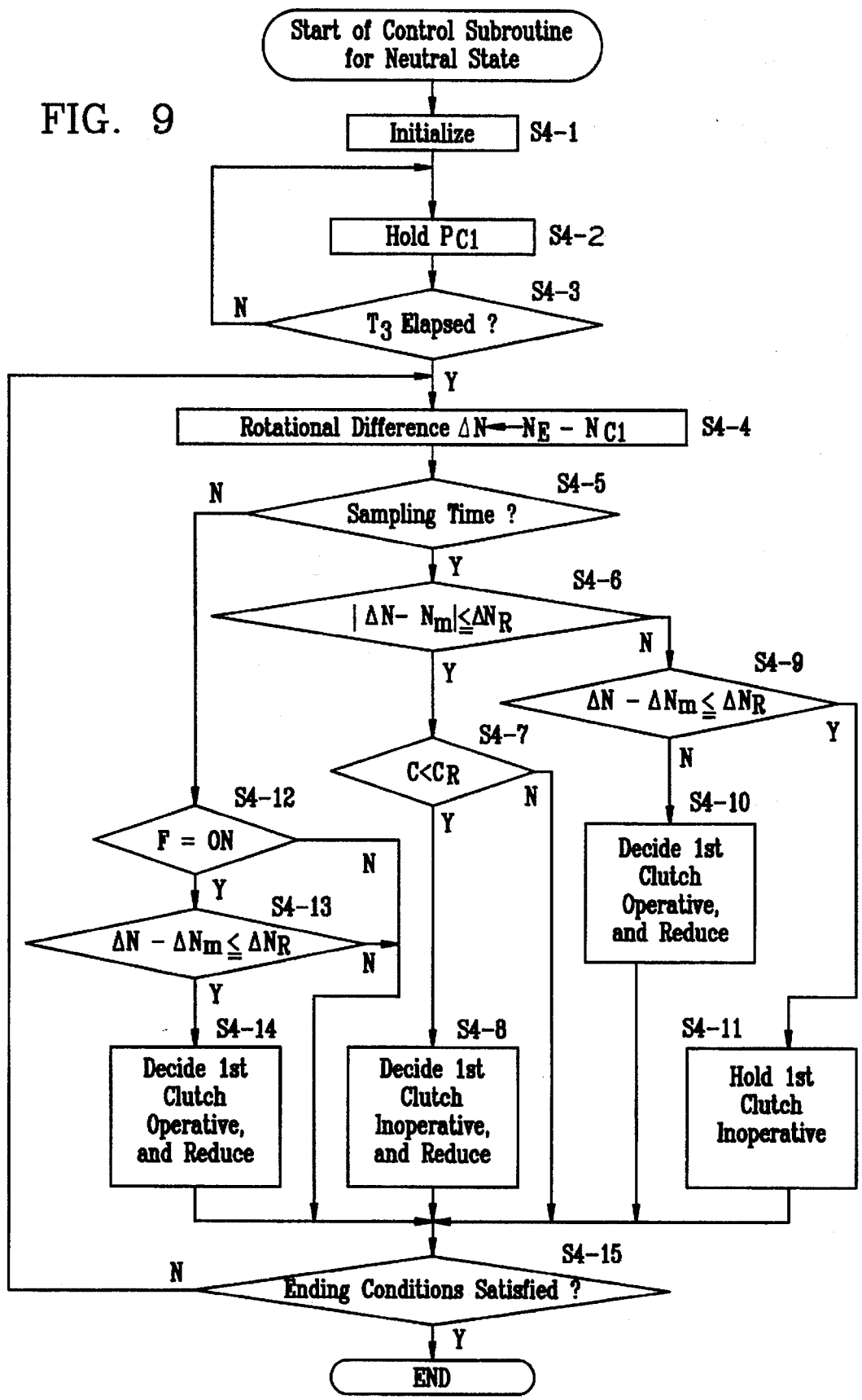
FIG. 9 is a flow chart showing a control subroutine for neutral state in the embodiment of FIG. 6 (step S-4)
Figure 12:
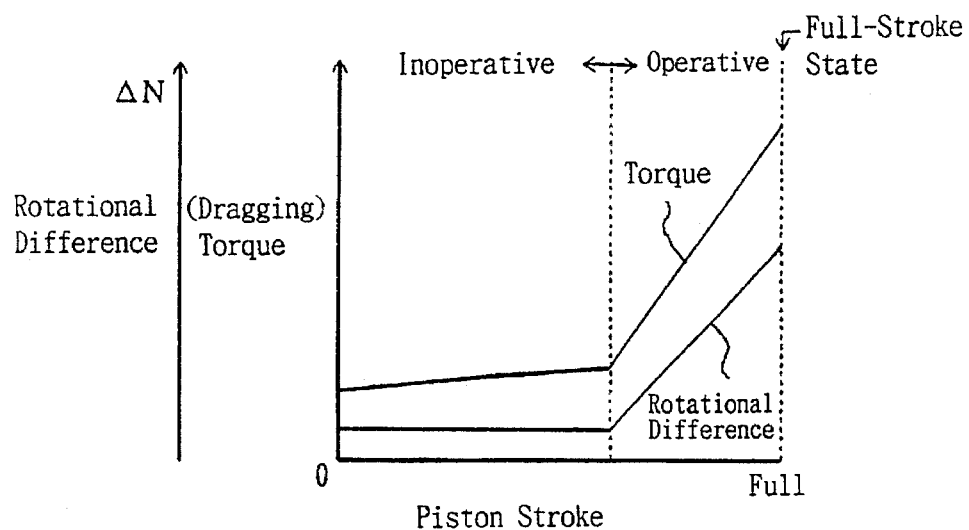
FIG. 12 is a diagram illustrating the state of the 1st clutch in the neutral state in an embodiment of the present invention, i.e. a graph of the rotational difference $\Delta N$ and the (dragging) torque against the piston stroke.
Figure 13:
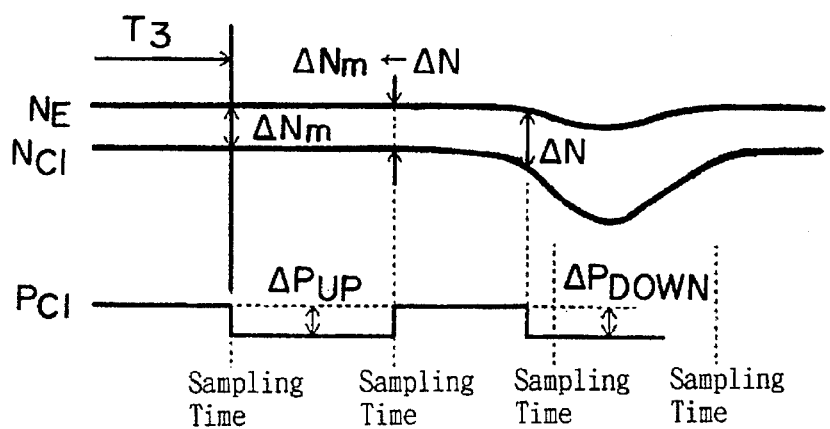
FIG. 13 is a time chart illustrating the engine R.P.M., the R.P.M. at the clutch input side and the C-1 oil pressure in neutral in an embodiment of the present invention.

Neutral state control, i.e. the subroutine of Step S4 of FIG. 6, will now be described with reference to FIGS. 9, 12 and 13.

Step S4-1: The initial values of a hydraulic control flag F, the count value C counted by the counter (not shown) and the reference rotational difference $\Delta Nm$ are set as follows:

F←OFF;

C←0; and $\Delta Nm$←the value $(N_E - N_{C1})$ at this time.

Steps S4-2 and S4-3: The C-1 oil pressure $P_{C1}$ is held at the final value in the first clutch releasing subroutine. A decision whether or not the rotational difference $\Delta N$ has changed immediately after confirmation of release the first clutch C1 (of FIG. 2) to a predetermined state, is subject to error due to the change in the rotational difference $\Delta N$ deriving from the pressure reduction in the first clutch releasing subroutine. By using the timer (not shown), therefore, the routine is delayed until a time period $T_3$ is elapsed, to hold the C-1 oil pressure $P_{C1}$. As a result, the decision of whether or not the rotational difference $\Delta N$ has changed is delayed until the C-1 oil pressure $P_{C1}$ has stabilized after the first clutch C1 has been released.

Step S4-4: The rotational difference $\Delta N$ between the engine R.P.M. $N_E$ and the clutch input side R.P.M. $N_{C1}$ is calculated by the rotational difference calculating means.

Step S4-5: It is decided whether or not a predetermined sampling time has been reached, that is, whether or not a time period such as 1.0 [sec.] or 0.5 [sec.] has elapsed. The subroutine advances to Step S4-6, if the answer is YES, and to Step S4-12 if NOT.

Step S4-6: It is decided whether or not the absolute value of the difference between the rotational difference $\Delta N$ and the reference rotational difference $\Delta N_m$ is no more than a preset value $\Delta N_R$, that is, whether or not the change in the rotational difference $\Delta N$ is no more than the preset value $\Delta N_R$. The subroutine advances to Step S4-7, if the answer is YES, and to Step S4-9 if NO. The set value $\Delta N_R$ is preset to discriminate between the operative state and the inoperative state of the first clutch C1, as shown in FIG. 12.

An erroneous input side R.P.M. sensor reading, erroneous output side R.P.M. sensor reading or a mistake in calculation of the rotational difference $\Delta N$, will result in an erroneous decision that the rotational difference $\Delta N$ has changed. Noting that the rotational difference $\Delta N$ abruptly changes if the application of the first clutch C1 is started from the state immediately before the application, therefore, it is decided that the rotational difference ΔN has changed if the change in the rotational difference ΔN exceeds the set value $ΔN_R$. In this manner, the control routine avoids an erroneous decision as to whether or not the rotational difference ΔN has changed.

Because the set value $ΔN_R$ is changed according to the oil temperature, the C-1 oil pressure $P_{C1}$ can be accurately controlled regardless of whether the oil is hot or cold.

Step S4-7: It is decided whether or not the count value C of the counter is smaller than a set value $C_R$. The subroutine advances to Step S4-8, if the answer is YES, and to Step S4-15 if NO.

Step S4-8: It is decided that the first clutch C1 is in the inoperative state, because there is no change in the rotational difference ΔN. Since, in this state, the clutch piston may have excessively returned, the booster means boosts the C-1 oil pressure $P_{C1}$ by a set pressure $ΔP_{UP}$ in the following manner, as illustrated in FIG. 13:

$$P_{C1} \leftarrow P_{C1} + P_{UP}.$$

Moreover, the rotational difference ΔN is set to the reference rotational difference $ΔN_m$, and the oil pressure control flag F is turned ON, as follows:

$$ΔN_m \leftarrow ΔN; \text{ and}$$

$$F \leftarrow ON.$$

Step S4-9: It is decided whether or not the tendency in the change in the rotational difference ΔN is a decrease, that is, whether or not the difference of the rotational difference ΔN from the reference rotational difference $ΔN_m$ is no more than the set value ΔNR. The subroutine advances to Step S4-11, if the answer is YES, and to Step S4-10 if NO.

Step S4-10: It is decided that the first clutch C1 is in transition from the inoperative state to the operative state, and the C-1 oil pressure $P_{C1}$ is reduced by the set pressure $ΔP_{DOWN}$, as follows:

$$P_{C1} \leftarrow P_{C1} - ΔP_{DOWN}.$$

Moreover, the rotational difference ΔN is set to the reference rotational difference $ΔN_m$; the oil pressure control flag F is turned OFF; and the value "1" is subtracted from the count value of the counter. Moreover, the C-1 oil pressure $P_{C1}$ at this instant is set as the reference C-1 oil pressure $P_{C1m}$, as follows:

$$ΔNm \leftarrow ΔN;$$

$$F \leftarrow OFF;$$

$$C \leftarrow C-1 \text{ (wherein } C=0 \text{ if } C<0\text{); and}$$

$$P_{C1m} \leftarrow P_{C1}.$$

Step S4-11: It is decided that the first clutch C1 is in transition from the operative state to the inoperative state, the C-1 oil pressure $P_{C1}$ is held at the value at this instant, and the oil pressure control flag F is turned OFF, as follows:

$$F \leftarrow OFF.$$

In other words, when the first clutch C1 is in transition from the operative state to the inoperative state, the rotational difference ΔN decreases. If, at this time, the C-1 oil pressure $P_{C1}$ is further lowered, the clutch piston may be abruptly retracted with an excessive stroke loss. Therefore, when the first clutch C1 is in transition from the operative state to the inoperative state, the reduction of the C-1 oil pressure $P_{C1}$ is inhibited and held at $P_{C1m}$.

Step S4-12: It is decided whether or not the oil pressure control flag F is ON, that is, whether or not the C-1 oil pressure $P_{C1}$ has been boosted at the previous sampling time. The subroutine advances to Step S4-13, if the oil pressure control flag F is ON, and to Step S4-15 if OFF.

Step S4-13: Since the C-1 oil pressure $P_{C1}$ was boosted at the previous sampling time, it is decided whether or not the difference between the rotational difference ΔN and the reference rotational difference ΔNm is equal to or less than the set valve $ΔN_R$. The subroutine advances to Step S4-14, if the answer is YES, and to Step S4-15 if NO.

Step S4-14: Since the C-1 oil pressure $P_{C1}$ was boosted at the previous sampling time, the rotational difference ΔN has changed. Hence, it is decided that the first clutch C1 is applied, and the pressure reducing means reduces the C-1 oil pressure $P_{C1}$ by the set pressure $ΔP_{DOWN}$, as follows:

$$P_{C1} \leftarrow P_{C1} - ΔP_{DOWN}.$$

Moreover: the rotational difference ΔN is set to the reference rotational difference $ΔN_m$; the oil pressure control flag F is turned OFF; and the count total of the counter is incremented by "1". Then, as at Step S4-10, the C-1 oil pressure $P_{C1}$ at this instant is set as the reference C-1 oil pressure $P_{C1m}$, as follows:

$$ΔNm \leftarrow ΔN;$$

$$F \leftarrow OFF;$$

$$C \leftarrow C+1; \text{ and}$$

$$P_{C1m} \leftarrow P_{C1}.$$

As described above, it is decided whether or not the rotational difference has changed at the time of each sampling. If the C-1 oil pressure $P_{C1}$ is boosted according to that decision, the application of the first clutch C1 may be instantly started with slipping engagement and generation of the idling vibration. If, therefore, the rotational difference ΔN increases while the first clutch C1 is starting to engage, the C-1 oil pressure $P_{C1}$ is lowered without awaiting the time of the next sample. Thus, the first clutch C1 can be prevented from coming into slipping engagement, thereby preventing idling vibration.

As described above, moreover, the C-1 oil pressure $P_{C1}$ is changed only if the change in the rotational difference ΔN is higher than the set value $ΔN_R$ at the time of each sampling. However, if the rotational difference ΔN only gradually changes, the C-1 oil pressure $P_{C1}$ may not be changed although the first clutch C1 has already come into engagement. By updating the reference rotational difference ΔNm only when the C-1 oil pressure $P_{C1}$ is changed, therefore, this change of the C-1 oil pressure $P_{C1}$ can be ensured in case the rotational difference ΔN is only gradually changed so that the first clutch C1 will come into engagement.

Step S4-15: It is decided whether or not the ending conditions for the pseudo-neutral state of the first clutch C1 are satisfied. This neutral condition controlling subroutine is ended, if the answer is YES. If NO, the subroutine returns to Step S4-4, and the foregoing Steps are repeated.

Figure 14:
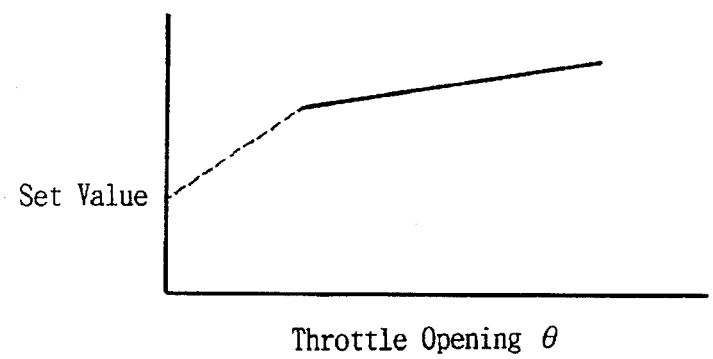
FIG. 14 is a graph plotting a set value against throttle opening in an embodiment of the present invention.
Figure 15:
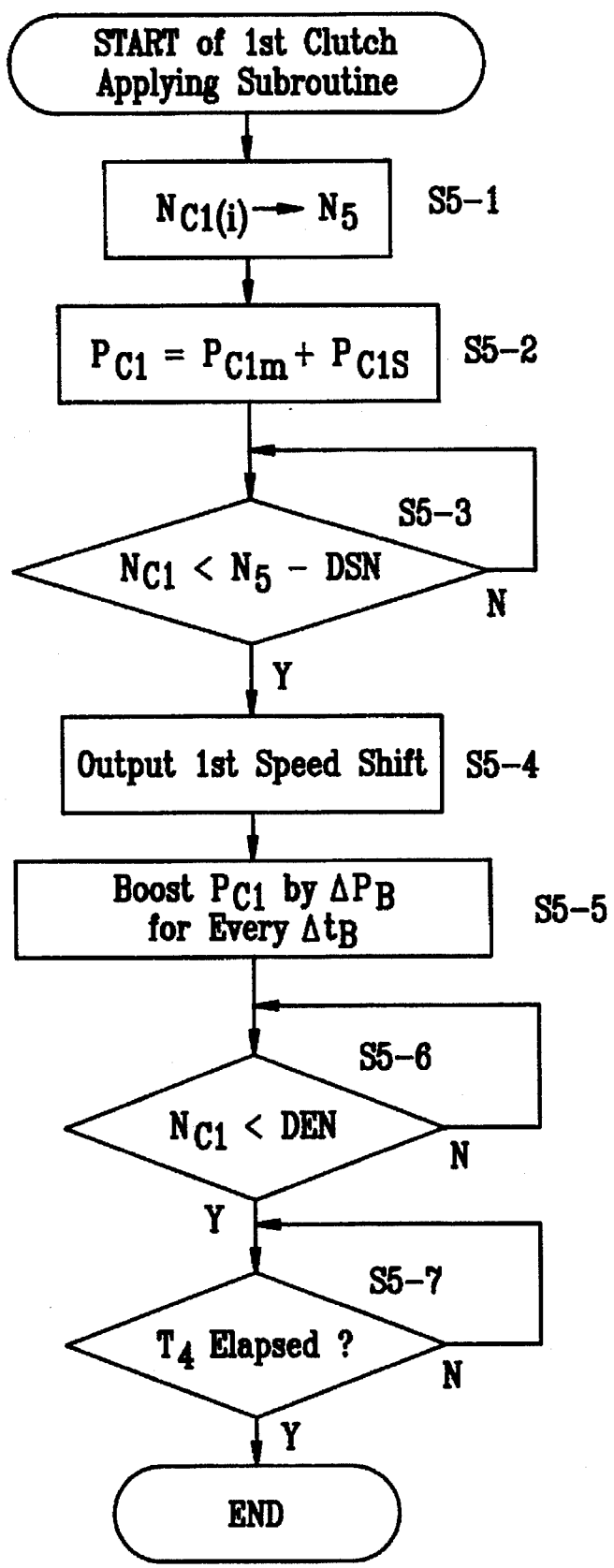
FIG. 15 is a flow chart of a 1st clutch applying subroutine (step S5 in FIG. 6) in an embodiment of the present invention.

With reference to FIGS. 14 to 15, the subroutine of Step S5 of FIG. 6 for applying the first clutch will be described.

Step S5-1: The clutch input side R.P.M. $N_{C1(i)}$, at the instant when conditions for the control of the neutral state have ended, is stored as a value $N_S$ in the memory (not shown) in the controller system 41 (of FIG. 2).

Step S5-2: A constant $P_{C1S}$ is added to the reference C-1 oil pressure $P_{C1m}$ set at Steps S4-10 and S4-11, and the sum is set as the C-1 oil pressure $P_{C1}$. Incidentally, the constant $P_{C1S}$ is set to a value ensuring a stroke of the piston (not shown) of the hydraulic servo C-1 (of FIG. 5) with minimal engaging shock.

Step S5-3: The routine waits until the clutch input side R.P.M. $N_{C1}$ becomes smaller than the difference between the value $N_S$ and a constant DSN. When the clutch input side R.P.M. $N_{C1}$ becomes smaller than that difference, the decision is made to start application of the first clutch C1 and the subroutine advances to Step S5-4.

Step S5-4: The 1st speed shifting output is generated.

Step S5-5: The throttle pressure $P_{TH}$ from the linear solenoid valve 66 (of FIG. 4) is changed, and the C-1 oil pressure $P_{C1}$ is boosted to a pressure $P_B$. After this, the C-1 oil pressure $P_{C1}$ is boosted by a set pressure $\Delta P_B$ at the end of every time period $\Delta t_B$ thereby to continue the application of the first clutch C1.

Step S5-6: The routine waits until the clutch input side R.P.M. $N_{C1}$ becomes lower than the constant DEN.

Step S5-7: Elapse of a time period $T_4$ is determined by use of a timer (not shown).

The aforementioned set values such as the constant $P_{C1S}$, the pressure $P_B$ and the set pressure $\Delta PB$ are set on the basis of a variable such as the throttle opening $\theta$ which, in turn, corresponds to the input torque $T_T$.

The fluctuation which is established in the C-1 oil pressure $P_{C1}$ and the clutch input side R.P.M. $N_{C1}$, when the neutral relay valve 64 is to be switched, will now be described with reference to FIG. 17.

In FIG. 17, $P_{C1}$: the C-1 oil pressure, $N_E$: the engine R.P.M., and $N_{C1}$: the clutch input side R.P.M. As seen in FIG. 17, as the third solenoid valve S3 (of FIG. 5) is turned ON/OFF, the neutral relay valve 64 (of FIG. 4) is switched to effect release or application of the first clutch. In the switching of the neutral relay valve 64, the C-1 oil pressure $P_{C1}$ drops in the prior art, as indicated by broken curve, but not in the present invention.

Moreover, during switching of the neutral relay valve, a slipping state is established at the input side R.P.M. $N_{C1}$ in the prior art, as indicated by the broken curve, but not in the present invention.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A control system for an automatic transmission which includes means for selecting one of a plurality of range positions, a clutch which is applied responsive to selection of a forward range position, a hydraulic servo which receives oil pressure for applying the clutch and a hydraulic control unit for controlling the oil pressure to the hydraulic servo, wherein the hydraulic control unit comprises:

a manual valve having a forward drive position wherein said manual valve receives oil from an oil pressure source and outputs a forward range oil pressure to a first oil passage;

a regulator valve for regulating the oil pressure coming from said oil pressure source and for outputting regulated oil pressure to a second oil passage;

a third oil passage for feeding oil pressure to the hydraulic servo;

a change-over valve switchable between a first position for feeding said forward range oil pressure to the third oil passage and a second position for feeding said regulated oil pressure to the third oil passage;

a fourth oil passage for feeding said regulated oil pressure to said hydraulic servo while bypassing said change-over valve during switching of said changeover valve; and one-way valve means located in said fourth oil passage for allowing oil flow only in the direction from said regulator valve to said hydraulic servo.

2. A control system for an automatic transmission, according to claim 1, wherein said hydraulic control unit further comprises:

a linear, first solenoid valve for outputting a control oil pressure to said regulator valve to cause said regulator valve to generate said regulated oil pressure according to said control oil pressure; p1 a solenoid valve for outputting a signal oil pressure to said change-over valve to switch said change-over valve between said first position and said second position;

range position detecting means for detecting the selected range position;

vehicle stop detecting means for detecting if the vehicle is stopped;

solenoid control means for outputting a signal to said second solenoid valve to switch said change-over valve to said second position, responsive to detection of the forward range position by said range position detecting means and when the vehicle is stopped, as detected by said vehicle stop detecting means, and for outputting a signal to said linear, first solenoid valve for control of said regulator valve.

3. A control system for an automatic transmission, according to claim 2, wherein said solenoid control means outputs the signal to said linear, first solenoid valve to gradually lower the regulated oil pressure from the value immediately before the release of said clutch is started.

* * * * *

UNITED STATES PATENT AND TRADEMARK OFFICE
CERTIFICATE OF CORRECTION

PATENT NO. : 5,653,660
DATED : August 5, 1997
INVENTOR(S) : TSUKAMOTO et al

It is certified that error appears in the above-indentified patent and that said Letters Patent is hereby corrected as shown below:

Col. 5, line 8, begin a new paragraph with "At".

Col. 6, line 15, after "sensor", second instance, insert --49,-- and line 41, after "passage" insert --L-4,--.

Col. 10, line 41, "AN" should read --ΔN--.

Col. 14, line 36, delete "p1" and begin a new paragraph with "a".

Signed and Sealed this

Twenty-fifth Day of August, 1998

Attest:

BRUCE LEHMAN

Attesting Officer

Commissioner of Patents and Trademarks